United States Patent [19]

Jacoby

[11] 4,199,290
[45] Apr. 22, 1980

[54] MATERIAL HANDLING APPARATUS

[75] Inventor: Charles E. Jacoby, Bethlehem, Pa.

[73] Assignee: SI Handling Systems, Inc., Easton, Pa.

[21] Appl. No.: 923,115

[22] Filed: Jul. 10, 1978

[51] Int. Cl.² .................... B65G 67/36; B65G 67/02
[52] U.S. Cl. ................................ 414/354; 414/376; 414/401; 414/582; 414/584
[58] Field of Search ............... 414/401, 376, 373, 387, 414/572, 575, 582, 584, 340, 341, 354, 355, 278; 193/35 A, 32, 40; 104/34

[56] References Cited

U.S. PATENT DOCUMENTS

| | | | |
|---|---|---|---|
| 552,145 | 12/1895 | Richmond | 414/355 X |
| 1,362,019 | 12/1920 | Lübeck | 104/34 X |
| 1,842,396 | 1/1932 | Fitch | 414/340 |
| 2,489,869 | 11/1949 | Dunn | 414/584 |
| 3,674,159 | 7/1972 | Lemelson | 414/278 X |
| 3,710,524 | 1/1973 | Seiz | 414/401 X |
| 3,777,867 | 12/1973 | Durwald | 193/35 A |
| 4,120,411 | 10/1978 | Johnson | 414/401 X |

FOREIGN PATENT DOCUMENTS 1755118  12/1971  Fed. Rep. of Germany .......... 414/373

*Primary Examiner*—Albert J. Makay
*Assistant Examiner*—Edmond G. Rishell, Jr.
*Attorney, Agent, or Firm*—Seidel, Gonda, Goldhammer & Panitch

[57] ABSTRACT

The apparatus includes a roller conveyor, a platform at one end of the conveyor, and a wheeled vehicle. The platform facilitates positioning the wheeled vehicle so that the bed thereon is aligned with a load support surface defined by rollers on the conveyor whereby the apparatus may be used for loading or unloading of trailer vans.

10 Claims, 6 Drawing Figures

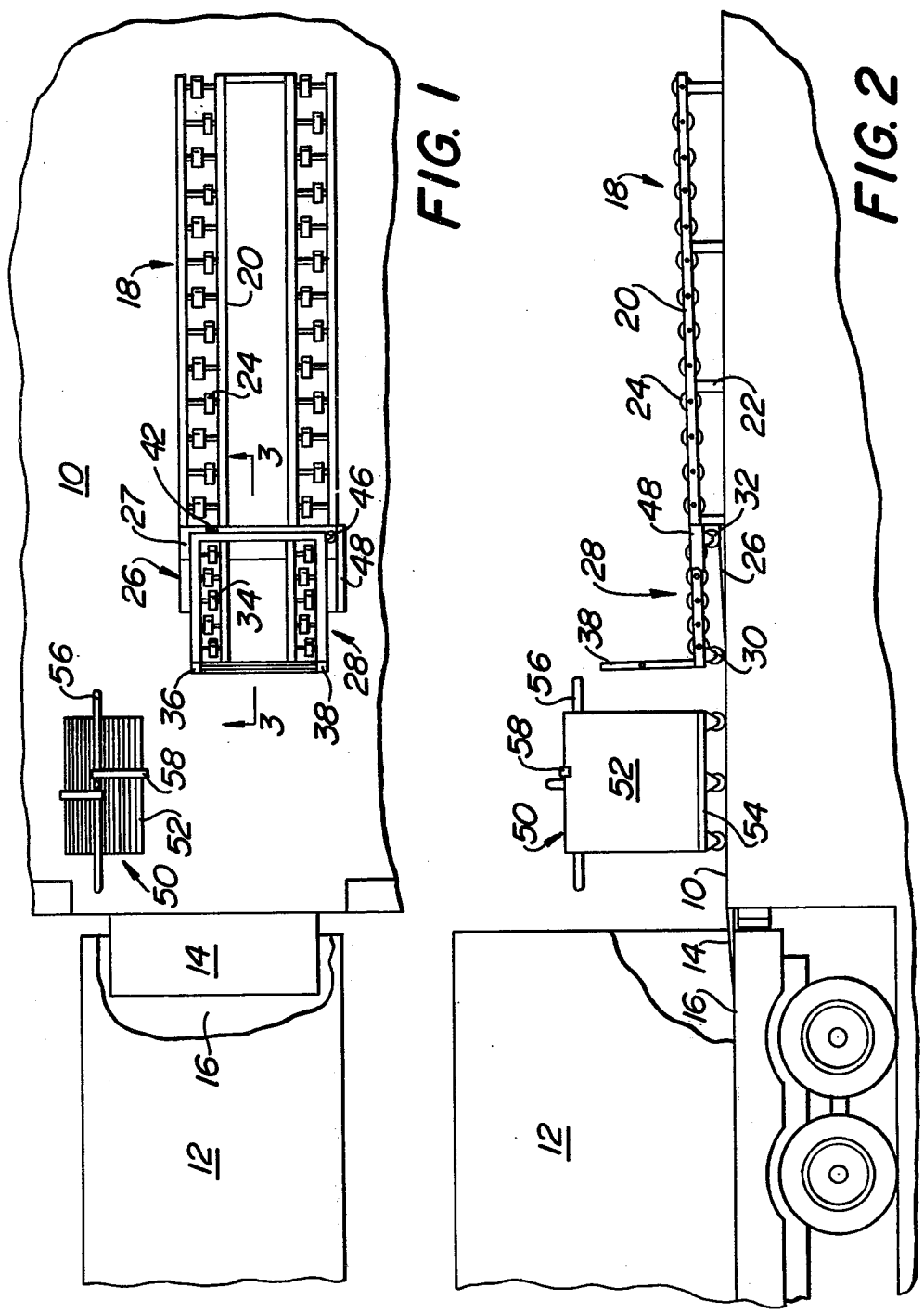

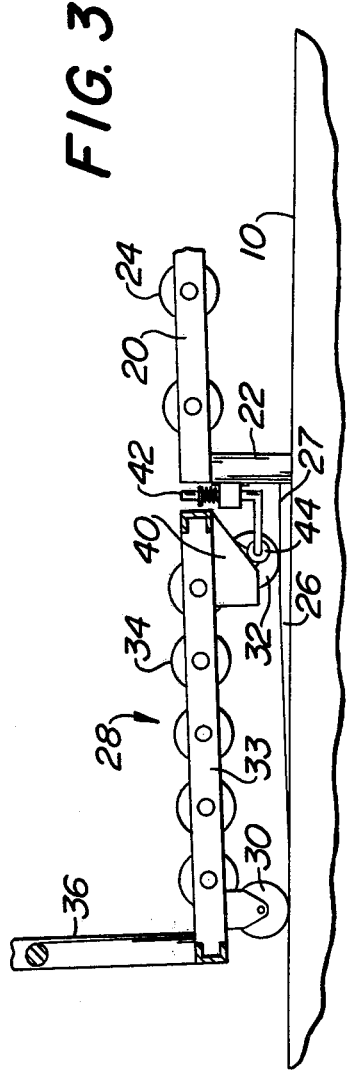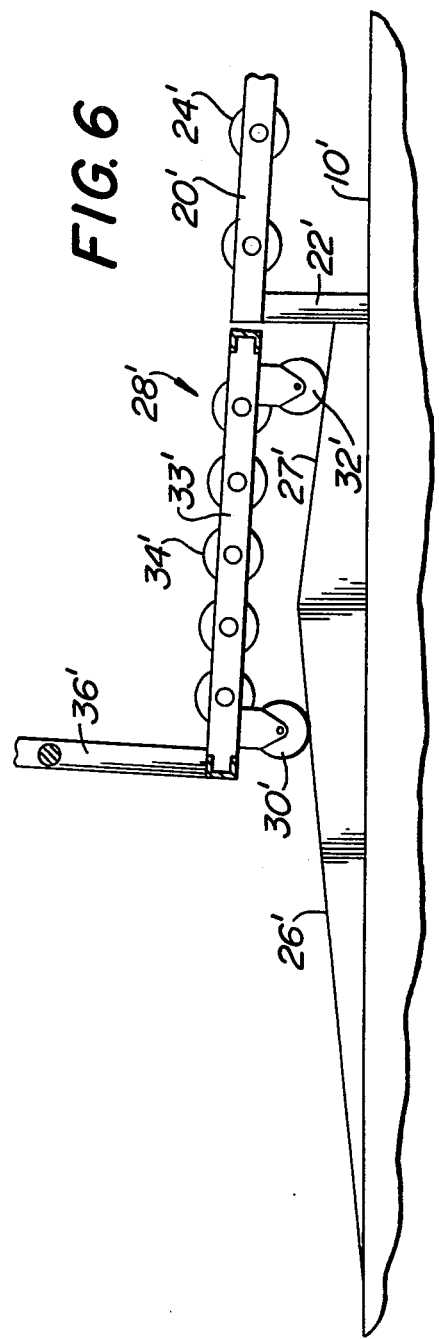

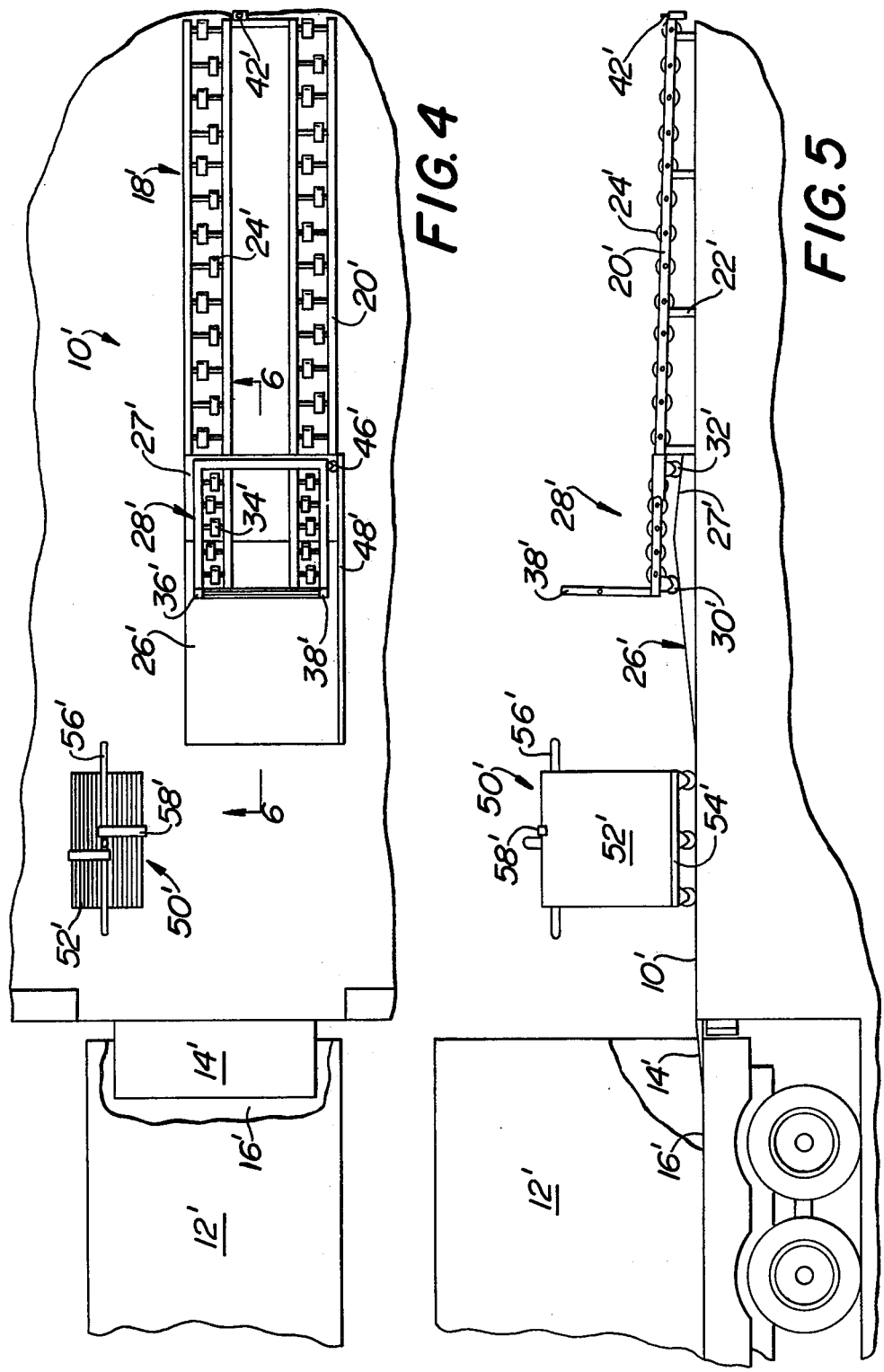

MATERIAL HANDLING APPARATUS

SUMMARY OF THE INVENTION

The present invention is directed to material handling apparatus for use in connection with loading or unloading a trailer van. The apparatus includes a wheeled vehicle having a load supporting bed and being of a size so that it may enter a trailer van. The apparatus also includes a roller conveyor having rollers which form a load support surface sloping at an acute angle of less than 3°. A platform is provided at one end of the conveyor and is arranged with a sloping surface below the elevation of said one end of the conveyor. The vehicle bed top surface is aligned with the load support surface when at least one pair of wheels of the vehicle is on said platform.

The apparatus may also include a pallet vehicle for supporting pallets. When the apparatus of the present invention is utilized for loading a vehicle, empty pallets obtained after a pallet load has been placed into the trailer van are then placed on the pallet vehicle. When unloading a trailer van, empty pallets are obtained from the pallet vehicle to facilitate removal of the contents from the van in the form of pallet loads.

It is an object of the present invention to provide material handling apparatus for loading or unloading a trailer van wherein such apparatus is simple, inexpensive and more efficient than prior apparatus.

It is another object of the present invention to provide inexpensive apparatus for rapidly loading and unloading trailer vans at a distribution dock.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a top plan view of a portion of a distribution dock and a trailer van to be loaded.

FIG. 2 is a side elevation view of the apparatus shown in FIG. 1.

FIG. 3 is an enlarged sectional view taken along the line 3—3 in FIG. 1.

FIG. 4 is a plan view of a portion of a distribution dock and a trailer van being unloaded.

FIG. 5 is a side elevation view of the apparatus shown in FIG. 4.

FIG. 6 is an enlarged sectional view taken along the line 6—6 in FIG. 4.

DETAILED DESCRIPTION

Referring to the drawings in detail, wherein like numerals indicate like elements, there is shown in FIG. 1 a portion of a distribution dock 10 and the rear end of a trailer van 12 which is being loaded. There is frequently a slight mismatch between the surface of the dock 10 and the floor 16 of the van 12. In such event, an adaptor plate 14 is utilized to provide a smooth transition.

A roller conveyor 18 is fixedly secured to the dock 10 at each loading and unloading position along the dock 10. The conveyor 18 includes a frame 20 which is sloped at an acute angle toward the trailer van 12. The frame 20 is supported by legs 22 which may be bolted to the dock 10. A plurality of rollers 24 are supported by the frame 20. In the preferred embodiment, there are two rows of such rollers 24 as shown more clearly in FIG. 1. As shown more clearly in FIG. 2, the rollers 24 define a load support surface which slopes toward the van 12 at an acute angle of less than 3°. In the preferred embodiment, the acute angle is 1.2°.

A platform 26 rests on the dock 10 adjacent the lower end of the frame 20. The platform 26 has a top surface which lies in two different planes. Adjacent the frame 20, a portion 27 of the top surface of platform 26 is horizontal with the remainder of the top surface being angled.

A wheeled transfer vehicle 28 is provided. The vehicle 28 has front wheels 30 and rear wheels 32 supported by a frame 33. The bed of the vehicle 28 is defined by a plurality of rollers 34. There are preferably two sets of rollers 34 as shown more clearly in FIG. 1. The front of the vehicle 28 preferably has upright posts 36 and 38 which provide a convenient handle for manually pulling or pushing the vehicle 28.

The vehicle 28 is provided with a latch actuator 40. Actuator 40 may be in the form of a cam surface. See FIG. 3. The lowermost end of the conveyor 18 is provided with a latch 42 which may take any convenient form. The latch 42 prevents a pallet load from rolling off the lowermost end of the conveyor 18. With latch 42 being a rod-like member biased upwardly, it may be automatically moved to a depressed position as shown in FIG. 3 by contact between actuator 40 and a follower roller 44. The follower roller 44 is connected to the latch 42. When the rear wheels 32 of the vehicle 28 are on the surface portion 27, the bed of the vehicle 28 is aligned at the same acute angle as the load support surface on the conveyor 18 whereby a pallet load may be transferred due to gravity from the conveyor 18 to the vehicle 28.

A guide means is provided on a vehicle 28 for cooperation with a guide rail 48. As shown more clearly in FIG. 1, the guide means on the vehicle 28 is a roller 46. The guide rail 48 is a vertically disposed plate which may be connected to either frame 20 or the platform 26. When the roller 46 is in rolling contact with a side face of rail 48, the rollers 34 on the vehicle 28 are aligned with the rollers 24 on the conveyor 18.

In a preferred embodiment of the present invention, the conveyor 18 has a length of about 20 feet, and the leading edge of the platform 26 is spaced from the edge of the dock by about 8 feet. The frame 20 is preferably provided with a space between the sets of rollers 24 adjacent the righthand end thereof so that the tines of a forklift truck may enter into such space and deposit a pallet load onto rollers 24.

As shown in FIGS. 1 and 2, there is provided a pallet cart designated generally as 50. The pallet cart 50 is provided with a bed 54 mounted on wheels and is adapted to support pallets 52 in an upright disposition. The cart 50 has a rack 56 which is centrally disposed and against which the pallets 52 rest. A bracket 58 may be provided for embracing the top edges of the pallets 52. One end of the brackets 58 may be pivotably connected to the rack 56 to facilitate access to the pallets 52.

The thusly described apparatus of the present invention may be utilized to load the trailer van 12 in the following manner. A forklift truck or other device is utilized to position pallet loads on the conveyor 18. Due to the slope of the conveyor 18, the pallet loads slowly move due to gravity toward the latch means 42 which arrests the leading pallet load. The vehicle 28 is then pushed so that at least its rear wheels 32 are on portion 27 of the platform 26. The latch actuator 40 depresses the latch means 42 and the leading pallet load moves due to gravity from the load support surface defined by rollers 24 onto the load support bed defined by the rollers 34 on the vehicle 28.

When pallet load has been transferred onto the vehicle 28, the operator pulls the vehicle 28 away from the conveyor 18 thereby permitting the latch means 42 to move upwardly and arrest movement of the next pallet load on the conveyor 18. The operator pulls or pushes the vehicle 28 into the van 12 and transfers the articles off the pallet and stacks the same. The empty pallet 52 is then placed on the cart 50 and the process repeated. Each time vehicle 28 is positioned as shown in FIG. 1, the operator attempts to have the roller 46 in rolling contact with the guide rail 48 so as to align rollers 34 with rollers 24. As mentioned above, the height of portion 27 of the platform 26 assures that the bed of vehicle 28 will be at the same acute angle as the conveyor 18 so that the rollers 34 form a continuation of the load support surface defined by rollers 24.

In FIGS. 4-6, there is illustrated another embodiment of the present invention for use in unloading a trailer van. The apparatus of FIGS. 4-6 is identical with that described above except as will be made clear hereinafter and wherein corresponding elements are provided with corresponding primed numerals.

The apparatus shown in FIGS. 5-6 is used for unloading the trailer van 12'. The conveyor 18' is sloped at the same acute angle as referred to above but in a direction away from the trailer van 12'. The top surface of platform 26' is defined by first and second portions slopig at different angles as shown more clearly in FIG. 6 with the rear wheels 32' being supported by portion 27' at an elevation so as to cause the vehicle 28' to be inclined at the same angle of inclination as the conveyor 18'. Hence, with the vehicle 28' supported by the platform 26', a pallet load will transfer due to gravity off the rollers 34' and onto the rollers 24'. The pallet loads may be transferred off the lower end of the conveyor 18' by a forklift truck or the like which triggers the latch means 42' and has tines which enter the space between rollers 24'.

The apparatus illustrated in FIGS. 4-6 is utilized as follows. The operator takes an empty pallet 52' off the cart 50' and places it on the vehicle 28'. Thereafter, the vehicle 28' is wheeled into the van 12' and loaded. The operator then pushes or pulls the loaded vehicle 28' onto the platform 26'. When the vehicle 28' is in the position shown in FIG. 6, the pallet load will transfer due to gravity onto the conveyor 18'. Thereafter, the operator places another pallet 52' on the vehicle 28' and the process is repeated.

The apparatus of the present invention is particularly useful on distibution docks wherein the load of one vehicle must be separated and dispatched to different destinations. When loading the pallets 52', the operator may select only those articles which are to be sent to a common destination thereby eliminating the need for segregation after unloading of the trailer van 12'. Other advantages of the present invention include apparatus which requires practically no maintenance, no wiring is required since there are no motors. The apparatus may be installed in a matter of hours and requires minimum floor space. Thus, in an operative embodiment of the present invention, the apparatus occupies 126 square feet of the dock surface. The apparatus can easily be installed by the customer and at all times there is access to the trailer van by way of a forklift truck if the articles are too bulky or too heavy for movement by a person.

The present invention may be embodied in other specific forms without departing from the spirit or essential attributes thereof and, accordingly, reference should be made to the appended claims, rather than to the foregoing specification, as indicating the scope of the invention.

I claim:

1. Material handling apparatus for use in connection with loading or unloading a trailer van comprising:
    (a) a wheeled vehicle having a load supporting bed, said vehicle being of a size so that it may enter a trailer van,
    (b) a conveyor frame supporting rollers in a manner so that the rollers form a load support surface which slopes at an acute angle less than 3°,
    (c) a platform at one end of said frame and arranged with a sloping surface below the elevation of said one end of said frame so that said bed top surface is aligned with said load supporting surface when at least one pair of wheels of the vehicle is on said platform.

2. Apparatus in accordance with claim 1 wherein said platform is at the lower end of said frame to facilitate transfer of a load from said conveyor to said vehicle for loading a van.

3. Apparatus in accordance with claim 2 including a latch means at said one end of said frame for retaining the load on said load supporting surface until released, and means on said vehicle for releasing said latch means.

4. Apparatus in accordance with claim 1 wherein said platform is at the higher end of said frame to facilitate transfer of a load from said vehicle to said conveyor.

5. Apparatus in accordance with any previous claim including a guide surface along one side of said platform for providing registration between said bed and said load supporting surface.

6. Apparatus in accordance with claim 1 wherein said conveyor frame supports two discrete rows of rollers, said load supporting bed on said vehicle being defined by two discrete rows of rollers, a space between said bed rollers corresponding to the space between said conveyor frame rollers.

7. Apparatus in accordance with claim 1 wherein said acute angle is approximately 1.2°.

8. Material handling apparatus for use on a dock comprising:
    (a) a conveyor frame supporting rollers in a manner so that the rollers form a load support surface which slopes at an acute angle of less than 3°, said frame supporting at least two parallel sets of said rollers spaced apart so that the tines of a forklift device may be positioned between said sets of rollers at one end of said frame,
    (b) a wheeled vehicle having a load supporting bed defined by a plurality of rollers, said vehicle being of a size so that it may enter a trailer van,
    (c) a platform at the other end of said frame below the elevation thereof, said platform having a sloping surface so that said bed rollers are aligned with said conveyor frame rollers when at least one pair of wheels of said vehicle is on said platform, and the upper surface of said platform being defined by at least two surfaces lying in different planes.

9. Apparatus in accordance with claim 8 including a guide surface along one side of said platform for providing registration between said vehicle bed and said conveyor frame, and a roller on said vehicle for rolling contact with said guide surface.

10. Apparatus in accordance with claim 8 including a loading dock having an edge which is adapted to be adjacent a trailer van, said platform being spaced from said edge while being between said edge and said conveyor frame.

* * * * *